UNITED STATES PATENT OFFICE.

FREDERICK WILLIAM DÄHNE, OF SWANSEA, GREAT BRITAIN.

IMPROVEMENT IN EXTRACTING GOLD.

Specification forming part of Letters Patent No. 159,647, dated February 9, 1875; application filed November 27, 1874.

*To all whom it may concern:*

Be it known that I, F. W. DÄHNE, of Swansea, South Wales, in the Kingdom of Great Britain, vice-consul of the German Empire, have invented a new and improved process for extracting gold from ores, regulus, alloys, and products of metallurgical operations, of which the following is a specification:

This invention is a new and improved process for extracting gold from ores, regulus, and products of metallurgical operations; and consists in the employment of liquid chlorine (by which term I mean an aqueous solution of chlorine, which I have obtained in practice by dissolving chloride of lime in water) and hydrochloric acid as a solving reagent for obtaining from the ore a solution of chloride of gold, and in subjecting this solution so obtained to the action of sulphurous acid ($SO_2$) in solution, by means of which the gold is precipitated in the form of powder.

By the employment of these special reagents I am enabled to accomplish two important results: First, the gold is obtained almost absolutely pure; and, second, the precipitating agent in solution may be neutralized, and the waste liquor be used again in the preparation of the solving solution.

To enable others skilled in the art to use my improved process, I will now proceed fully to describe the same.

The material to be treated, having been crushed or otherwise reduced to fine particles, is introduced into any suitable vessel with proper quantities of chloride of lime in solution and hydrochloric acid. The mixture then being properly agitated, the gold is dissolved and held in solution as chloride of gold. The supernatant liquor, after the mixture has been allowed to settle, is then decanted off into a suitable vessel, and boiled by steam to expel any excess of chlorine. The solution of chloride of gold thus obtained is then treated with sulphurous acid ($SO_2$) in solution, which, uniting with the chlorine, sets free the gold, which is precipitated in the form of a brown powder.

The precipitating solution, after the gold has been removed, may be utilized again in the preparation of the solving reagent.

This continuous use is rendered possible by the employment of the special reagents described in connection with each other.

The gold obtained should be absolutely pure.

Having thus described my improved process, what I claim as new, and desire to secure by Letters Patent, is—

The described process of extracting gold, consisting essentially in the treatment of auriferous material with an aqueous solution of chloride of lime and hydrochloric acid, and precipitating the gold from the solution thus obtained by sulphurous acid, substantially as described.

FR. W. DÄHNE.

Witnesses:
    HENRY H. FIELD,
        *Notary Public, Swansea.*
    JNO. REES,
        *His Clerk.*